C. B. TURNER.
Car Brake.

No. 5,918.

2 Sheets—Sheet 1.

Patented Nov. 14, 1848.

C. B. TURNER.
Car Brake.
No. 5,918.
2 Sheets—Sheet 2.
Patented Nov. 14, 1848.
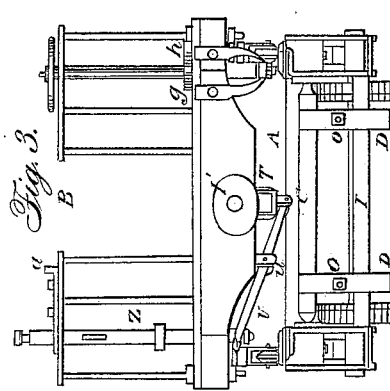
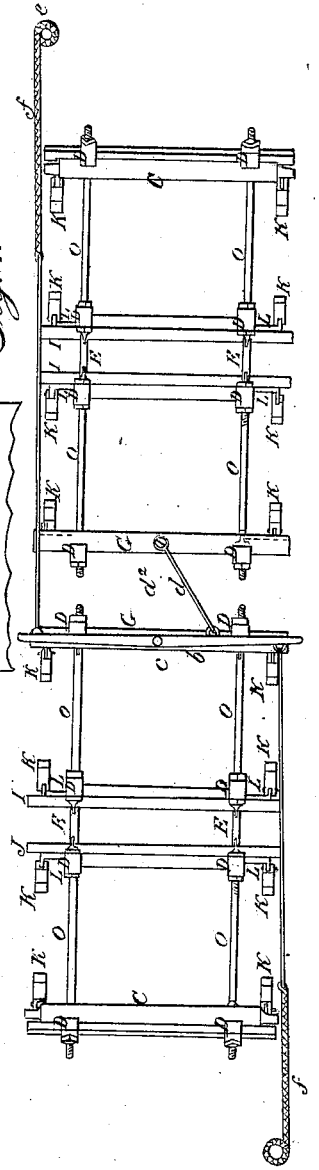
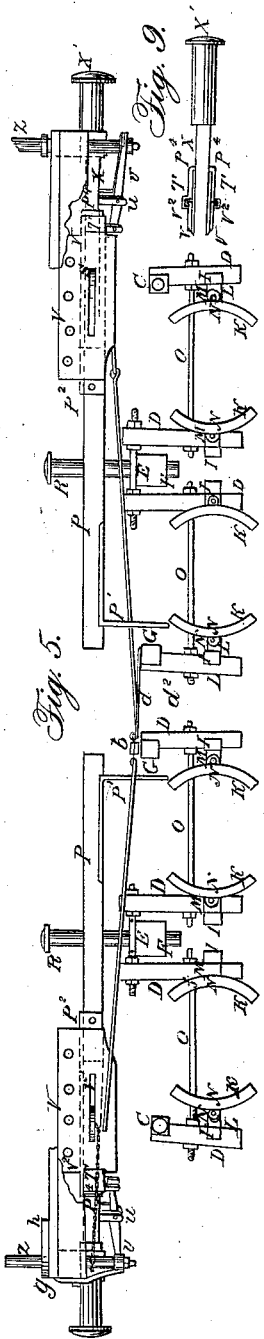
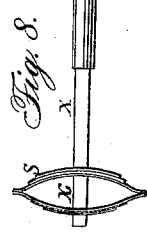
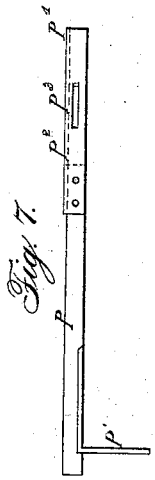
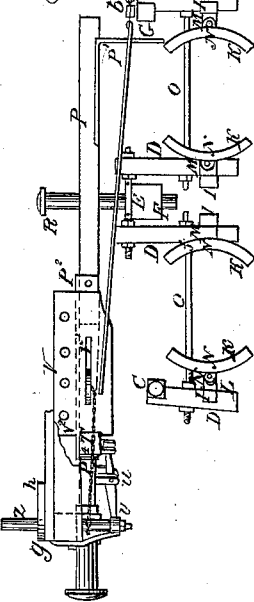

UNITED STATES PATENT OFFICE.

C. B. TURNER, OF BUFFALO, NEW YORK.

OPERATING-BRAKE FOR RAILROAD-CARS.

Specification forming part of Letters Patent No. 5,918, dated November 14, 1848; Reissued October 4, 1864, Nos. 1,783 and 1,784.

*To all whom it may concern:*

Be it known that I, CHARLES B. TURNER, of the city of Buffalo, in the county of Erie and State of New York, have invented a new and useful Improvement in Brakes for Railroad-Cars and other Purposes, which is described as follows, reference being had to the annexed drawings of the same, making part of this specification.

Figure 1:
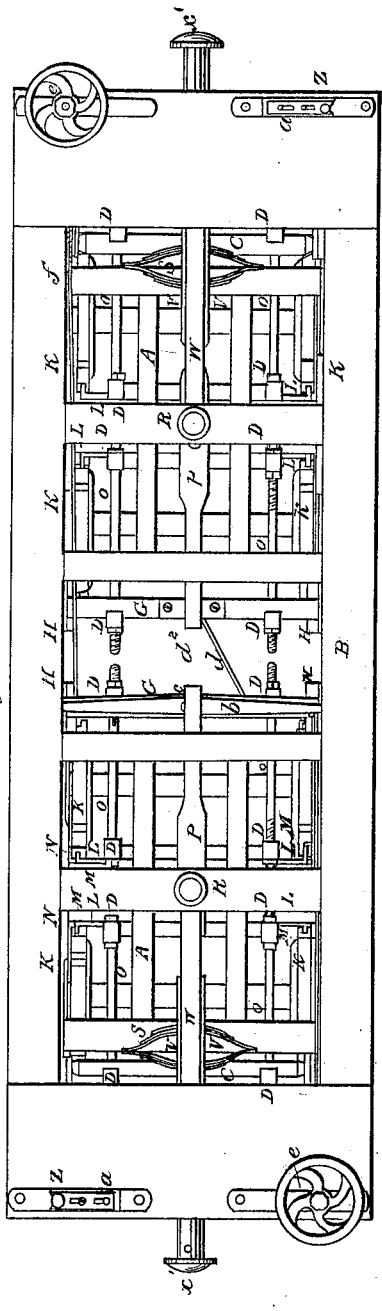
Figure 2:
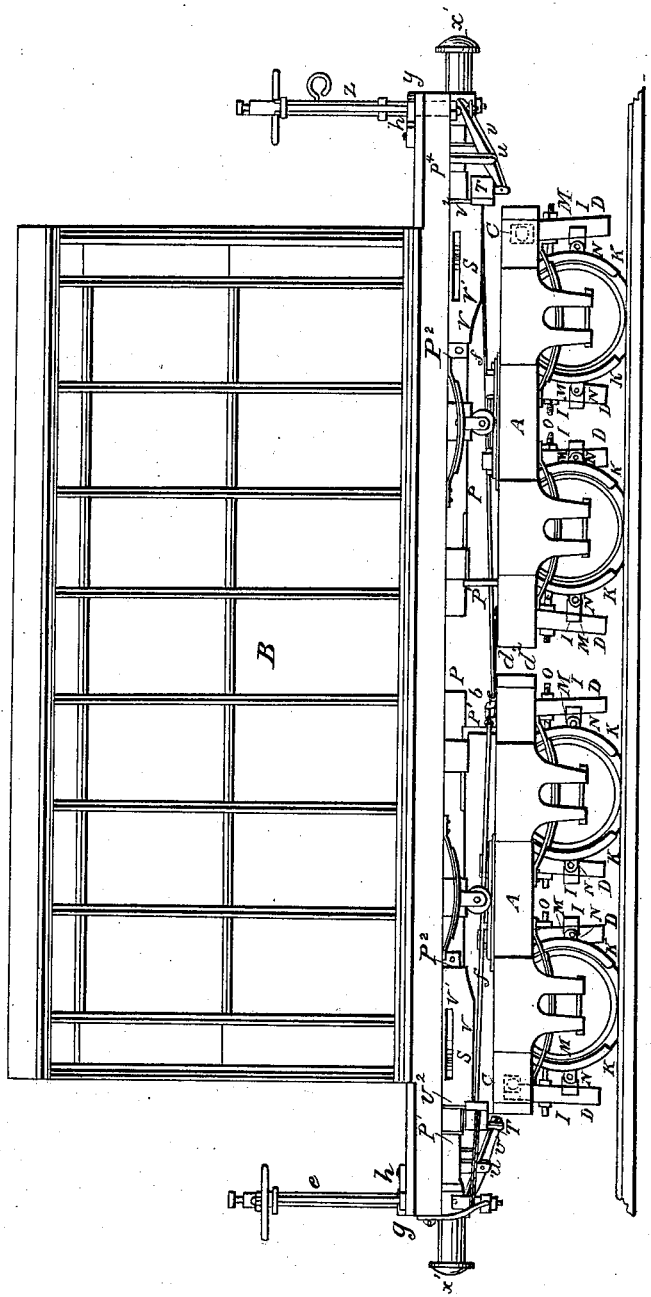

Figure 1 is a top view of two trucks and the bed, the body being removed. Fig. 2 is a side elevation of the car complete. Fig. 3 is an end elevation of the same. Fig. 4 is a top view of the brake detached from the car and without the bumper, spring, and beam. Fig. 5 is a side elevation of the same, the bumpers, springs, and beams being in place. Fig. 6 is a sectional view of the bumper, spring, and beam. Fig. 7 is a side view of the beam and right angled plate. Fig. 8 is a sectional view of the bumper and spring detached. Fig. 9 is a horizontal section showing one branch of the forked lock plate bent over the rib of the side plate.

The nature of my invention and improvement consists in a certain new and useful combination of horizontal transverse turning shafts, and pendant levers attached to them to which are secured horizontal transverse bars having concave rubbers affixed to press against the peripheries of the car wheels and intermediate suspended levers with similar transverse bars and concave rubbers and for the like purpose to those just mentioned placed against the opposite sides of the wheels the said pendant and suspended levers being connected by parallel longitudinal jointed screw rods and nuts, the upper end of the intermediate suspended levers being connected by transverse timbers the several series of rubbers attached to each car being actuated simultaneously by the momentum of the car, and a corresponding resistance of the contiguous car by acting against the sliding bumpers, springs and bars which in turn act against the horizontal transverse timbers that connect the upper ends of the intermediate suspended levers by which the concave rubbers are made to clasp the wheels in pairs and thus to arrest the motion of the car gradually and without producing a sudden and violent shock, a similar operation being produced on the several cars of the train in quick succession, there being two series of rubbers and bumpers to each car operated simultaneously. Said brakes being so arranged and combined with windlasses on the platforms of the cars by means of levers and connecting rods, and chains that the rubbers can be brought in contact with the wheels throughout the train simultaneously by the brakeman simply turning one of the windlasses.

The following is a description of the apparatus as applied to two trucks of a single car. All the cars of the train being provided in a similar manner, a description of one will suffice for the rest.

A A are two trucks for sustaining the body of the car, made in the usual manner.

B is the body of the car, also made in the usual manner.

C C are two horizontal transverse shafts for each car having gudgeons at their ends turning in boxes fastened to the inner sides of the side timbers of the trucks A.

D D &c. are sixteen short pendant levers attached to the trucks, four of which being secured at their upper ends to the two shafts C C, eight being arranged between the four pairs of wheels of the two trucks and suspended by jointed rods E, to horizontal cross timbers F of the truck frame, and four being attached to two transverse parallel timbers G resting loosely upon ledges H formed on the inner sides of the side timbers of the truck frames.

I I &c. are eight horizontal transverse bars of wood fastened to the aforesaid pendant levers, one to each pair of levers, at or near the lower ends of the same, to which bars the concave rubbers K are attached by means of right angled metallic plates L to parallel ears M and joint pins N. The rubbers may be attached to the levers D and the connecting bars I arranged near the middle of the levers and the connecting rods passed through them.

K, are the rubbers made of wood or other suitable material, the segment of a circle of the diameter of the wheels of the car. These rubbers are attached to the transverse bars I by means of the joint pins, ears and plates or in any convenient way. They are designed to rub against the peripheries of the car wheels when the lower end of the levers are moved toward them in the manner hereafter described. There are two rubbers to each wheel one on either side—the one counteracting the resistance of the opposite to prevent any strain on the axle of the car.

O are jointed screw rods that connect the pendant levers together in pairs, there being one rod to each pair of levers provided with joints to enable the several parts to operate freely, and with screws and nuts to set the rubbers to the wheels. The jointed screw rods E are designed to connect the middle levers of each truck as well as to suspend them to the transverse timbers F. The rubbers are set by means of these screws and nuts in a position not to touch the peripheries of the wheels when the brake is not in action as shown in Fig. 2. In this figure the rubbers appear to touch the flanges of the wheels but do not touch them.

P is a horizontal sliding bar with a right angled plate P' fastened to it that strikes against the transverse bar G when moved by the bumper for the purpose of actuating the brake. This bar moves horizontally and longitudinally over the center of the truck frame between guide plates and in mortises or gains in the frame.

P' is the right angled plate. The bar P is perforated vertically through near the middle of its length with an oblong mortise Q, through which is passed a vertical bolt R that connects the body with the truck and over which the bar slides back and forth.

The vertical parallel plates P² are fastened to the sides of the aforesaid sliding bar at the opposite end from that at which the right angled plate P' is fastened. These plates are perforated near the middle with oblong openings P³ one in each plate, to admit an elliptical or other spring S for preventing a sudden shock in arresting or starting the cars. These plates at their extremities are turned outwardly at right angles forming projections P⁴ against which the edges of a forked sliding lock plate T attached to the end of a lever U are brought in contact for preventing the bar P from sliding while backing the cars. When the brake is in action these plates move longitudinally between two parallel stationary guide plates V fastened to the sides of a central timber W of the body frame. These stationary plates V are also perforated with oblong openings V' through which is passed the elliptic spring S aforesaid. These guide plates are also turned outwardly at right angles at their outer extremities forming projections or stops V² for the opposite side of the lock plate to slide against and over and around which it is bent or hooked to guide it while sliding up and down as seen in Fig. 5 and more clearly in Fig. 9 which is a horizontal section of the lock plate when in contact with said turned edges of the parallel plates.

The bumper X is a square bar of iron perforated near one end with an oblong opening $x$ into which the elliptic spring S is inserted after the sliding bumper is inserted between the parallel plates P² of the sliding bar P. The bumper is made stout at the outer end forming a shoulder.

The outer extremity of the stout portion of the bumper is formed into a flat head X' where it receives the concussion. When this end is struck it moves the bumper inward, compresses the springs in the mortises of the plates of the sliding bar, moves the sliding bar P back causing the right angled plate P' to strike the transverse bar G and thus to actuate the brake.

In drawing the cars by the bumpers the same spring is contracted in the mortises in an opposite direction, preventing a sudden jar in starting the train.

T is a forked lock plate for locking the sliding bar and preventing it acting on the brake. This is done by raising it so as to bring its edges against the turned ends of the parallel plates as represented in Figs. 5 and 9. The forked lock is attached to the short end of a lever U whose fulcrum is at $u$ and whose long end is attached to a vertical stem $z$ which slides vertically in apertures in the frame. When this stem is up or down it is held by a horizontal key $a$ which prevents it from moving either way.

$b$ is a lever whose fulcrum is at $c$ on the transverse bar G and which lever is connected to the opposite parallel bar G by means of a connecting rod $d$. This lever is connected to a windlass $e$ at either end of the car by means of a chain or rope $f$ for the purpose of operating the brake by manual power instead of the momentum and resistance of the moving bodies.

The windlasses are made in the usual manner having ratchet wheels $g$ and palls $h$ on them of the usual form V arrangement for holding them in the desired position.

The simultaneous action of the eight rubbers on the four wheels of each truck is produced in the following manner. The movement of the right angled plate P' attached to the sliding bar P toward the center of the car at $d^2$ brings the plate in contact with the bar G and causes it, together with the pendant levers D and bars I, through the intervention of the connecting rods O and E, to move in the same direction except the upper end of the lever attached to the rock shaft C which remains in one position, the lower end moving toward the center and the rubbers K on the right of the wheels to strike the peripheries of the wheels, when the upper ends of the levers D commence to turn in the arc of a circle, the rods O serving as fulcra, causing the movement of the rubbers on the left of the wheels to be reversed or moved toward the wheels until they touch the peripheries when they will counteract or resist the pressure of the rubbers on the opposite sides.

When the locomotive is arrested by shutting off the steam—or by the application of a hand brake, or by other means—the bumper X of the forward car is brought into contact with the bumper of the tender by the momentum of the car and caused to slide inward toward the center of the car and at the same time to act against the spring S and the spring S against the slide P causing the slide to move toward the center of the car and against the transverse bar G which it moves toward the center of the car, bringing the rubbers K against the wheels through the agency of the several connecting screw rods O and E that connect the levers together, to which the bars and rubbers are affixed—producing an equal pressure on the opposite sides of the wheels by which the axle is relieved from all strain. A similar effect is produced on the wheels of the other truck by a similar arrangement of rubbers, bars, levers, and rods actuated by a similarly constructed bumper spring and slide moved by the momentum of the next car in the train whose bumper strikes the last named bumper and in this manner actuating all the bumpers, slides, and rubbers in quick succession throughout the entire train.

When the windlass $e$ is turned by hand it winds the chain $f$ and turns the lever $b$ on its movable fulcrum $c$ at the same time draws the bars G G toward each other through the agency of the connecting rod or chain which puts in simultaneous action all the bars, rods and rubbers attached to the pair of trucks of the car body.

In order to lock the slides and prevent their action on the brakes as must be done in case of backing the train, the forked lock plate T must be raised and brought between the projections $P^4$ $V^2$ on the sides of the parallel plates by depressing the rod $z$ against the lever. The bumper then acts in the usual manner.

The before described combination of rubbers, rods, levers and bumpers is susceptible of various modifications without changing the general principle on which it operates; for instance, the pendant levers may be concave and act as rubbers and may be hinged to the frame of the car and be connected by rods and levers actuated by horizontal longitudinal slides connected to levers by slots, or oblong mortises or otherwise. Said slides being moved by bumpers to be composed of parallel rods, plates and spiral springs and prevented from operating by keys or bolts affixed to right angled levers forced through the horizontal slides to prevent the bumpers acting on them when backing the cars, &c., at other times; said slides being made with stops on them against which transverse parallel plates of the bumpers strike; between which spiral springs may be placed for breaking the shock so that when the bumper is pressed inward either by the momentum of the car bringing it in contact with the buffer of the locomotive or car forward of it or otherwise it may press back the forward transverse plate, causing the spiral springs to contract, forcing their opposite ends against the rear transverse plate and press said plate against a shoulder on the horizontal sliding connecting rod, thus causing the rubbers to act on the wheels the pendant rubber on one side of the wheel acting as the fulcrum of the lever which acts on the opposite pendant rubber causing the rubbers or pendant levers to embrace the peripheries of the wheels simultaneously and on the principles above stated. The sliding bar may be locked to the bumper to prevent actuating the brake while backing by means of a sliding bolt, spring pin or any suitable mechanical device instead of the before described lock plate.

To prevent the action of the rubbers on the wheels in backing the cars a lever for actuating the rubbers connected by suitable rods and chains may be so arranged as to be struck by the sliding bar when required and thrown aside out of the reach of the sliding bar when not required to operate, as in backing. This effect, however, may be produced in various ways. The rubbers may be placed and operated between the several pairs of wheels instead of being made to clasp the wheels and yet may be caused to act on the principle above stated.

What I claim as my invention and desire to secure by Letters Patent is—

1. Constructing the brake so as to act simultaneously on all the wheels of the car or cars of the train, on opposite sides, by the momentum and resistance of the several cars, and the consequent contact of the bumpers, which actuate the rubbers, and by which the motion of the cars is arrested; that is to say, I claim the combinations of the rubbers K, levers D, shafts C, G, bars I, and rods O, E, arranged and operated in the manner and for the purpose above set forth, or other mode, substantially the same; or operated by manual power applied through the agency of the windlasses $e$, chains $f$, levers $b$, rods $d$ or other similar contrivances.

2. I claim the manner of constructing the sliding spring bumper for operating the brake by the momentum and resistance of the cars as described; that is to say, I claim the combination of the slide P with the bumper X, and spring S constructed, arranged and operating in the manner described; or other mode which may be substantially the same.

I make no claim to the several parts individually considered, as they are believed to be common mechanical devices, but the combination and arrangement of them and mode of operation is considered new.

In testimony whereof I have hereunto signed my name before two subscribing witnesses this 23d day of March, 1848.

C. B. TURNER.

Witnesses:
WM. P. ELLIOT,
LUND WASHINGTON, Sr.

[FIRST PRINTED 1913.]